Aug. 22, 1967 W. H. RYAN 3,337,341
PHOTOGRAPHIC ADDITIVE COLOR IMAGES AND PRINTS
UTILIZING LIGHT-POLARIZING MEDIA
Filed Dec. 3, 1963

INVENTOR.
William H. Ryan
BY
Brown and Mikulka
ATTORNEYS 3,337,341
PHOTOGRAPHIC ADDITIVE COLOR IMAGES AND PRINTS UTILIZING LIGHT-POLARIZING MEDIA
William H. Ryan, Carlisle, Mass., assignor to Polaroid Corporation, Cambridge, Mass., a corporation of Delaware
Filed Dec. 3, 1963, Ser. No. 327,788
14 Claims. (Cl. 96—2)

This invention relates to a method of producing multicolored images and to a novel photographic color print assembly adapted to use in conjunction therewith.

It has been known, as described, for example, in the U.S. Patent 2,289,714 to Edwin H. Land, that images rendered in a light-polarizing medium and in full color can be superimposed and yet preserve their individual visibility and functional character. It has further been disclosed that color-separation images, representative of the warm and the cool colors of a subject, can be produced so as to appear in a gamut of colors using a minimum of color-providing means, as, for example, when viewed merely in red and white light. A discussion of the principles involved in the latter operation is to be found in "Colour Cinematography" (1951) by Cornwell-Clyne, Chapman & Hall, Ltd., London, England, pages 260, 261 and in "Scientific American," May 1959, pages 94–99. The present invention draws upon phenomena involved in these methods but in a manner and for purposes quite different from those heretofore disclosed.

Thus, for example, whereas previous polarizing color imagery has been largely directed toward producing images rendered in a plurality of subtractive colors for stereoscopic viewing, the present invention employs neutral-toned polarizing color-separation images, in conjunction with means related to the aforesaid minimum color-providing means, to provide, additively, a simplified type of two-dimensional multicolored print. It is believed that this is the first instance of a multicolored photographic print assembly composed of a pair of non-screened continuous-tone, black-and-white, color-separation images superimposed in exact register and embodying additive color-providing means.

In accordance with the foregoing considerations, an object of the invention is to provide a photographic print exhibiting a plurality of colors through a novel additive color process.

Further objects are to provide a photographic print in which but a single colored component is employed in the production of a plurality of visible colors; to provide a multicolored print of the character described employing a pair of colored components; to provide a multicolored print which includes color-separation records embodied in individual layers thereof and rendered in a neutral toned light-polarizing medium or media; to provide a multicolored print including superimposed light-polarizing color-separation images formed in individual strata in exact register; to provide a photographic print of the type described comprising a pair of layers bearing differently oriented light-polarizing images in assembled relation with a colored light-polarizing film material having a light-polarizing orientation similar to that of one of the images; and to provide photographic prints of the character described in the form of either transparencies or reflection prints.

Other objects will in part be obvious and will in part appear hereinafter.

The invention accordingly comprises the process involving the several steps and the relation and other of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
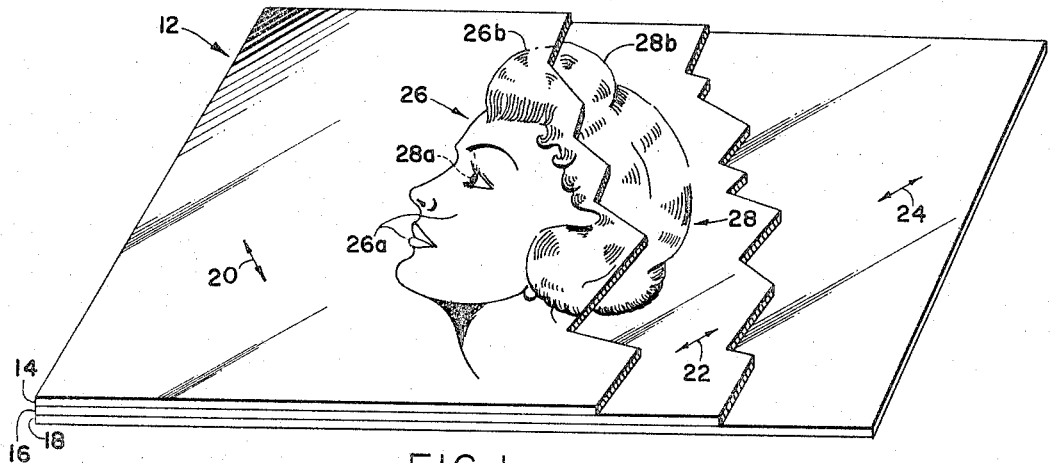
FIGURE 1 is a perspective view, with parts broken away, of a photographic print assembly of the invention.

Light-polarizing images and the principles generally involved in their formation have been known for a considerable period. They have been described, for example, in U.S. Patents 2,203,687, 2,204,604, 2,315,373, 2,329,543 and 2,373,035. Images of the aforesaid type are generally printed in a dichroic stain or dye on the surface of a suitable molecularly oriented film composed of a suitable plastic material. Frequently, they have been printed on differentially molecularly oriented surfaces of a film or films bonded to a transparent supporting plastic sheet material, the aforesaid surfaces having orientations at 90° to one another. Each light-polarizing image, when printed in one of the ways mentioned above, shows differing optical densities or different degrees of contrast between its light and dark areas when viewed in polarized light as, for example, through a light-polarizing analyzer, the vibration direction of the last-named polarized light being at approximately 90° to the vibration direction of the polarized light transmitted by the image. Printed light-polarizing images of the type described have usually been employed as stereoscopic pairs having parallactic differences in conjunction with light-polarzing analyzing means in the form of spectacles, each lens of which is oriented oppositely to one of the images so as to render visible and limit the perceptibility of a given image to one eye while similarly rendering the other image exclusively visible to the other eye.

In an additive-system color-separation positive, the transparent or low density areas represent the presence of a color in the original scene. The high density areas or black represent absence of that color in the original scene. The degree to which light is transmitted by each unit of area of the positive is in relation or ratio to the amount of the separated color reflected or emitted by the original subject. In a light-polarizing or so-called "Vectograph" image forming a color-separation record, light vibrating in the transmission direction will be passed essentially without modulation by the dichroic dye or stain, while light, vibrating at 90° to the transmission direction, will be transmitted only according to the relative amount of the separated color present in the scene, being regulated by the density of the dye or stain from point to point. Density in a color-separation positive may, of course, represent another color, or a neutral tone, or black, or a low illumination or an absence of illumination in the original scene.

The images contained in a print assembly of the present invention are produced through the medium of a dichronic stain or dye printed on molecularly oriented plastic films. However, in contrast to those above-described, they are color-separation images rendered in a neutral tone; they are in exact register instead of being relatively offset because of stereoscopic differences; they are incorporated in an entirely different type of print assembly as will be apparent from the description which follows, and no light-polarizing viewing spectacles are necessary. The term "dichroic" as employed herein with reference to a stain or dye indicates that the molecules thereof show dichroism in the sense that they contribute to divide an incident beam of light into two components having relatively different vibration directions and transmit one component while absorbing the other. The terms "polarizing direction" or "axis," "transmission direction" and "vibration direction" are used synonymously herein.

Referring now to FIGURE 1, a print assembly 12 of the invention visible in a gamut of colors is shown diagrammatically. The assembly comprises first, second and third light-transmitting plastic film components constituting layers 14, 16 and 18, each composed, for example, of a high-molecular-weight hydroxyl-containing, vinyl polymer having its molecules oriented in directions indicated by the double-headed arrows 20, 22 and 24, respectively. A preferred material for forming the aforesaid layers is polyvinyl alcohol and it may be assumed that the layers have been individually molecularly oriented, as by stretching in the directions shown and, thereafter, at some selected stage of forming the print, to be described, bonded together by a suitable bonding substance, such as a solution comprising polyvinyl alcohol, to form an integral structure. The layers 14 and 16 are preferably colorless and the layer 18 contains a red dichroic dye distributed uniformly throughout its area and thus constitutes a colored linear polarizer which absorbs preferentially in a given wavelength band of the visual spectrum.

Continuous-tone images 26 and 28 identified, respectively, with cool and warm color taking means, are printed in a neutral-toned dichroic stain or dye on the molecularly-oriented layers 20 and 22, the printing substance being imbibed into the layers in a known manner. Image 26 is a light-polarizing image having a polarizing direction, also represented by the double-headed arrow 20, and image 28 is a light-polarizing image having a polarizing direction also represented by the double-headed arrow 22. The stain or dye molecules are aligned parallel to the oriented molecules of the respective film layers 14 and 16 and, accordingly, the arrows may be taken as indicating both the orientation directions of the films and the polarizing or transmission directions of the images. Similarly, the arrow 24 indicates the polarizing direction of the red-dyed layer 18. Inasmuch as the layers are transparent, portions of both the images 26 and 28 are, of course, visible. A dichroic stain suitable for use in forming the color-separation positive images 26 and 28 comprises an aqueous iodine-iodide solution. A red dichroic dye adapted to use in preparing the colored polarizer 18 is Fastusol Red 4BA–CI28160. A solution consisting of 3.75 grams of the latter dye in 495 cc. of water was found to be satisfactory for imbibition into the sheet 18.

The image 26, although identified with a cool color-separation taking means, is a neutral-toned positive record. It may be considered as having been produced, for example, by taking means such as a green filter in conjunction with an orthochromatic negative emulsion or any other suitable single, or combination of, filter and film sensitization means. The image 28, although identified with the warm color-separation taking means, is also a neutral-toned positive record. It may be produced, for example, by taking means including a red filter and/or a panchromatic emulsion, or any other suitable filter or sensitized emulsion or combination thereof. It may, of course, be assumed that the intermediate range of densities in each record will, in the composite assembly, represent a mixture of many colors in the subject and that both records include densities representing essentially neutral-toned areas of the subject, e.g., the black hair portions 26b and 28b present in both film layers 14 and 16. As indicated, the terms "warm" and "cool," as used herein, are to be taken as having the usual photographic connotation. Warm colors may, for example, be taken as including such colors of the visible spectrum as red, orange, and yellow and cool colors as including green, cyan, blue and violet.

The superimposed light-polarizing, color-separation images 26 and 28 are arranged in exact register or optical alignment with respect to one another. This condition may be achieved through any one of several possible methods, as follows. The images may be printed on separate films 14 and 16 and the latter then brought to proper superimposed and bonded relation. The films 14 and 16 may first be bonded together and the images printed on the outer exposed surfaces thereof. The films 14 and 16 may be bonded to a transparent dimensionally-stable, and preferably isotropic support layer (not shown), located, for example, either centrally or at one side of the assembly. The layer 18 may be bonded to either layer 14 or 16 or to a support layer and perform its function satisfactorily or it may be employed as a separate unit for viewing the assembly of layers 14 and 16.

The print assembly of FIGURE 1, as described, is a transparency which may be employed either for direct viewing or for projection. When thus employed, a two-dimensional image exhibiting a plurality of colors is visible even though but a single color-providing substance is actually embodied in the assembly, namely the red dichroic dye of the colored polarizer 18. The production of a gamut of colors in the visible image involves the aforesaid phenomenon wherein a plurality of colors with in a band of wavelengths of the visible spectrum become individually distinguishable through the use of light of a given color with white light. This may be considered as effected by an additive color procedure involving the transmitted red color of the layer 18 and a positive image-carrying layer with which it is functionally associated, as explained below, in conjunction with the transmitted white light which is functionally associated with the other positive image-carrying layer. Through psychological and physiological means, not wholly understood, the composite image will be seen by an observer in the full range of natural colors as the original scene. (See E. H. Land "The Sleeping Beauty," Proceedings of the National Academy of Science, Nov. 20, 1957.)

Figure 2:
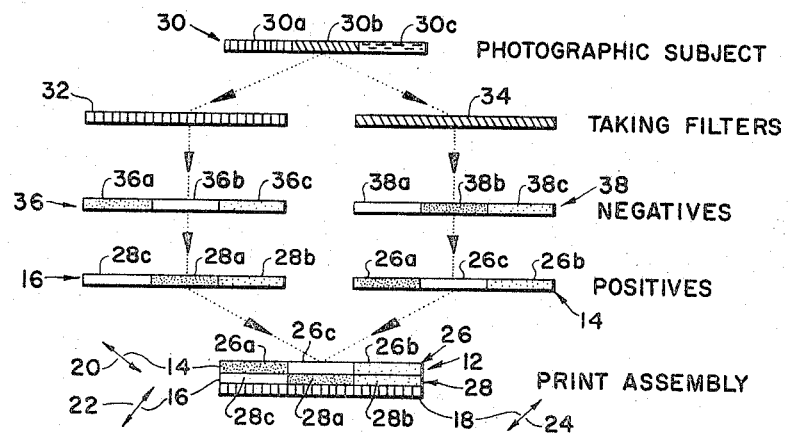
FIG. 2 is a diagrammatic view showing an arrangement of elements adapted to use in the method of the invention and illustrating various steps thereof.

An outline of the sequence of operations involved in color production by the present invention is shown diagrammatically in FIG. 2, it being understood that merely general procedures can be represented in a diagram and that the manner by which subtle intermediate colors and the like are provided cannot be completely shown therein but can readily be inferred from that which is illustrated. A fragment, only, of a variously colored photographic subject is illustrated at 30. For purposes of explanation, the subject may be considered as composed of warm-color portions 30a, cool-color portions 30b, and essentially neutral-toned portions 30c. It will be understood that various intermediate colors or shades thereof may be present and that intermingling and overlapping of warm, cool and neutral components may occur. A pair of filters suitable for photographic taking purposes includes a red filter 32 and a green filter 34. The filters are used in exposing the negatives 36 and 38, respectively. Assuming development of the negatives by any conventional means, the density 36a representative of the warm-color portion 30a of the subject, the clear area 36b representative of the cool-color portion 30b of the subject, and the density 36c representative of neutral-toned portions 30c and intermediately-colored portions of the subject, are produced in the negative 36 by exposure through the red filter. With respect to the negative 38, assuming exposure through the green filter, the clear area 38a represents the warm-color portion 30a of the subject; the density 38b represents the cool-color portion 30b of the subject; and the density 38c represents the neutral-toned portions 30c and the intermediate colored portions thereof.

Positive image components such as have been shown in FIGURE 1 are then produced by printing from the negatives 36 and 38 on matrix film, developing the matrix film, imbibing a dichroic stain or dye into the latter, and printing from the matrices on the molecularly-oriented film materials 14 and 16. The density scale of the color-separation positives is, of course, reversed with respect to the density scale of the negatives. Thus, the light-polarizing positive image formed on the film 14 includes the density 26a denoting in the original scene an absence of light of a cool color such as green, the neutral density 26b, denoting a mixture of green with other colors, and the clear area 26c representing the presence of light of a color such as green. The light-polarizing positive image formed on the film 16 includes the density 28a, representing an absence of light of a warm color such as red, the neutral density 28b, denoting a mixture of red with other colors and the clear area 28c denoting the presence of light of a warm color such as red. It will be understood that in a continuous-tone image the foregoing densities and clear areas actually constitute a very large number of points distributed throughout the picture area and that the densities may, individually, vary considerably in degree thereof. The assembly of elements 14, 16 and 18 at the final stage of FIG. 2 represents diagrammatically that of FIGURE 1 and shows the overlying relation of density and clear areas of the respective color-separation images 26 and 28.

The parallel relation of the polarization axes of layers 16 and 18 provides essentially unmodulated white light in the polarizing axis direction, while the density of the red color, transmitted at 90° to the polarizing axis direction, is modulated by the density of the positive 16. Similarly, the crossed relation of the polarizing axes of layers 14 and 18 causes a modulation by the positive image of layer 14 of the white light component, only, of layer 18.

Figure 3:
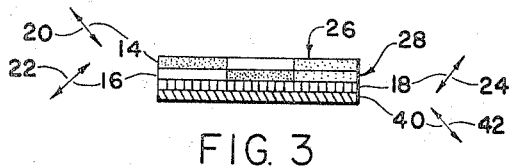
FIG. 3 is a fragmentary side view of a modified print assembly of the invention.

A modification of the color print assembly is shown in FIG. 3. The unit includes the molecularly-oriented layers 14, 16 and 18 containing image components of the type already described with respect to FIGS. 1 and 2. Additionally, it includes a light-polarizing layer 40 having a polarizing axis indicated by the double-headed arrow 42. The layer 40 is a linear, uniformly-polarizing or partially-polarizing element of preferably low density, of a neutral-to-cool-color type such as grey, or a dilute cyan or blue. The function of element 40 is to balance the apparent relative brightnesses of the component images by reducing the intensity of the light modulation by the layer 14 and to correct for any inefficiency of the red polarizer 18 which might cause the cool-color image portions to be tinted with a warm color, e.g., pink. These functions are achieved by reason of the crossed relation of the polarizing axis of layer 40 with the light-polarizing axis of layer 16, when taken with the parallel relation of the polarizing axis of layer 40 with the aforesaid axis of layer 14. The function of crossed and parallel axes in an operation of this nature has been described above and in the aforesaid reference patents.

Figure 4:
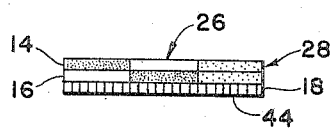
FIG. 4 is a similar view of another modification of the print assembly.

The structure of FIG. 4 adds a non-depolarizing, reflecting layer 44 to that which has previously been described. The resulting structure constitutes a multicolored reflecting print, the function of the various components being, generally, unchanged.

Figure 5:
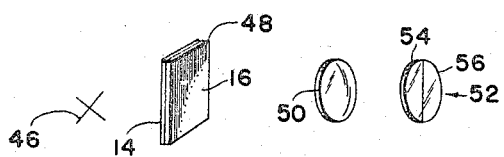
FIG. 5 is a diagrammatic representation of a projection adaptation of the invention.

In FIG. 5, a projection system exemplifying the principles of the present invention is shown diagrammatically. The system includes a light source 46, a transparency 48, similar to that of FIGURE 1 exclusive of the colored polarizing layer 18, an objective 50, a split-field light-polarizing element 52 having sections 54 and 56 in superimposed relation with lens 50 and a fragment of a non-depolarizing projection screen 58. The section 54 is composed of a red light-polarizing film having a transmission direction crossed with that of the light-polarizing image of layer 14. The section 56 is a neutral or slightly colored light-polarizing film having a transmission direction crossed with that of the light-polarizing image of layer 16. The operation of the system, particularly with respect to the light-polarizing components, is generally similar to that of the assembly of FIG. 3.

Various other modifications of the method and structures described herein are possible within the scope of the invention, Thus, in FIGURE 1, the colored polarizer 18 can be positioned contiguous with layer 14 instead of with layer 16, as shown. For the colored polarizer 18 of FIGURE 1, it would be possible to substitute, in order from layer 16, a birefringent layer and a linear polarizer, properly oriented with respect to one another and to layer 16, as a color-producing means. A neutral-toned linear polarizer with a filter, e.g., a Wratten filter No. 25, transmitting in the 580 to 700 m$\mu$ range, could possibly be employed in place of a colored polarizer wherein the latter has been specified. Although linear polarizers are preferred in the structures described herein, right- and left-handed circular polarizers are usable in place of linear polarizers in a manner known to the art. The invention is not limited to the production of positive images, it being equally possible, of course, to provide light-polarizing negative prints. The production of light-polarizing images by methods other than printing in a dichroic stain or dye from matrices as, for example, by a dye-destruction or bleaching method, is to be construed as encompassed by the present invention. Wherein continuous-tone images have been specified and the invention is particularly adapted to the production thereof, the multicolored images produced by the method described herein are not limited to those of a continuous-tone category and may be of a line, half-tone or some other type. In the showing of FIG. 5, instead of the split-field polarizer 52, it would be possible to use a colored, uniformly-polarizing element similar to the polarizer 18, positioned separately in the system, located adjacent to the lens 50, or combined with the transparency 48 so as to be similar to the structure 12 of FIGURE 1.

Although it has been specified herein that a colored light polarizer, and more particularly a red polarizer, has been employed as the element 18 of FIGS. 1 through 4, with a definite relation of its polarizing axis to the axes of images 26 and 28, some modification thereof is possible consistent with the phenomenon underlying the use of monochromatic and white light and within the field of additive two-color synthesis. The red polarizer 18 in combination with essentially white light constitutes a preferred embodiment, but other components which could be employed in its stead with some measure of success include, for example, merely a colored polarizer in place of element 18 which transmits light of a wavelength band up to approximately 580 m$\mu$ and has its transmission direction at 90° to that of the direction 24 shown for element 18. A second example would include the combination of a polarizer transmitting light of a wavelength band above 550 m$\mu$ and having a transmission direction similar to the direction 24 with another polarizer transmitting light of a wavelength band between 400 and 500 m$\mu$ and having a transmission direction similar to the direction 42 of FIG. 3. Still other two-color combinations are possible.

Since certain changes may be made in the foregoing product and process without departing from the scope of the invention herein involved, it is intended that all matter contained in the above description or shown in the accompanying drawing shall be interpreted as illustrative and not in a limiting sense.

What is claimed is:

1. A method of producing and viewing a composite photographic image so that it exhibits a plurality of colors, comprising the steps of making a pair of positive transparencies from a pair of color-separation records of the warm- and the cool-color content, respectively, of a photographic subject photographically taken from one position, each transparency being in the form of a given color-separation linearly light-polarizing image rendered in a substantially neutral tone and having a polarizing axis disposed at approximately 90° to that of the other, superimposing and exactly aligning said transparencies so that the images of each are in exact register with one another, and viewing the images through the medium of a linearly light-polarizing element having its polarizing axis disposed at approximately 90° to that of a given one of said images and approximately parallel to that of the other image.

2. A method, as defined in claim 1, wherein said light-polarizing element is, at least in part, a colored light polarizer.

3. A method, as defined in claim 1, wherein said transparencies and light-polarizing element are placed in contiguous relation so as to form an integral assembly.

4. A method, as defined in claim 1, wherein said light-polarizing element is a red light polarizer.

5. A method, as defined in claim 2, wherein said light-polarizing element is an individual element placed in spaced relation to said transparencies.

6. A method, as defined in claim 2, wherein said light-polarizing element is a red light polarizer placed so that its polarizing axis is at approximately 90° to that of said light-polarizing image identified with said cool-color content of said photographic subject and approximately parallel to that identified with said warm-color content.

7. A method, as defined in claim 2, wherein said transparencies and light-polarizing element are placed in the path of beams from a light source for projection onto a non-depolarizing screen.

8. A method, as defined in claim 7, wherein said light-polarizing element is a split-field polarizer comprising a colored area and a substantially uncolored area and wherein said element is placed contiguous with the objective of said projector.

9. A method of producing a composite photographic image exhibiting a gamut of colors, comprising the steps of preparing, through conventional exposure and developing means, a pair of negative color-separation records of the warm- and the cool-color content, respectively, of a photographic subject photographically taken from one position, making a pair of positive transparencies from said color-separation records, each containing a color-separation linearly light-polarizing image rendered in a substantially neutral tone and having a polarizing axis disposed at approximately 90° to that of the other, and superimposing said transparencies in optical alignment with each other and with a colored linear light-polarizing film so that the polarizing axes of said images are at approximately 90° with respect to one another and the polarizing axis of said colored light-polarizing film is at 90° to that of a selected one of said images and parallel to that of the other image.

10. A method, as defined in claim 9, wherein the polarizing axis of said colored film is at 90° to that of said image which is identified with the cool-color content of said subject.

11. A method of producing a composite photographic image exhibiting a gamut of colors, comprising the steps of preparing, through conventional exposure and developing means, a pair of negative color-separation records of the warm- and the cool-color content, respectively, of a photographic subject photographically taken from one position, making a pair of positive transparencies from said color-separation records, each containing a color-separation linearly light-polarizing image rendered in a substantially neutral tone and having a polarizing axis disposed at approximately 90° to that of the other, and superimposing said transparencies with each other and with a pair of linear light-polarizing films so that the polarizing axes of said images are at approximately 90° with respect to one another and the polarizing axis of each of said light-polarizing films is at 90° to a selected one of said images while parallel to that of the other image, at least one of said light-polarizing films being a colored light polarizer.

12. A photographic print assembly exhibiting a plurality of colors comprising a pair of superimposed transparencies representative of two photographic exposures from a single position, each containing a linearly light-polarizing image rendered in a substantially neutral density and having a transmission direction disposed at approximately 90° to that of the other, the images of said transparencies being color-separation records of the warm- and the cool-color content, respectively, of a photographic subject, and being thus superimposed in exact register with one another, said assembly being adapted to be viewed through linearly light-polarizing means comprising at least one colored light polarizer having a transmission direction disposed at approximately 90° to that of a given one of the light-polarizing images and approximately parallel to that of the other image.

13. A photographic print assembly exhibiting a plurality of colors comprising a pair of superimposed transparencies representative of two photographic exposures from a single position each containing a linearly light-polarizing image rendered in a substantially neutral density and having a transmission direction disposed at approximately 90° to that of the other, the images of said transparencies being color-separation records of the warm- and the cool-color content, respectively, of a photographic subject, and being thus superimposed in exact register with one another, and linear light-polarizing means superimposed with said transparencies, said means comprising at least one colored light-polarizing film having a transmission direction disposed at approximately 90° to that of a given one of the light-polarizing images and approximately parallel to that of the other image.

14. A photographic print assembly, as defined in claim 13, wherein said colored light-polarizing film is of a warm color and its transmission direction is disposed at approximately 90° to that one of said images which is a color separation record of the cool-color content of said subject.

References Cited
UNITED STATES PATENTS

| | | | |
|---|---|---|---|
| 2,854,335 | 9/1958 | Mahler | 88—29 |
| 2,882,631 | 4/1959 | Boone | 96—40 |
| 3,003,391 | 10/1961 | Land | 96—24 |
| 3,148,058 | 9/1964 | Land et al. | 96—2 |
| 3,254,999 | 6/1966 | Land | 96—2 |

NORMAN G. TORCHIN, *Primary Examiner.*

J. TRAVIS BROWN, *Examiner.*